United States Patent [19]

Sasaki

[11] 4,003,347
[45] Jan. 18, 1977

[54] ROTARY PISTON ENGINE
[75] Inventor: Yoshio Sasaki, Toyota, Japan
[73] Assignee: Toyota Jidosha Kogyo Kabushiki Kaisha, Aichi, Japan
[22] Filed: Feb. 28, 1975
[21] Appl. No.: 554,106
[30] Foreign Application Priority Data
 Sept. 26, 1974 Japan .............................. 49-109985
[52] U.S. Cl. .............................................. 123/8.13
[51] Int. Cl.² ......................................... F02B 53/06
[58] Field of Search ............. 123/8.09, 8.13, 190 A
[56] References Cited
UNITED STATES PATENTS
3,780,707 12/1973 Cole .................................. 123/8.13

*Primary Examiner*—Carlton R. Croyle
*Assistant Examiner*—Michael Koczo, Jr.
*Attorney, Agent, or Firm*—Toren, McGeady and Stanger

[57] ABSTRACT

An improvement in the suction mechanism of a rotary engine is provided in that two peripheral ports each with a rotary valve are formed in the peripheral wall of the rotor housing having a trochoidal inner peripheral surface and that during the first half period of the suction stroke one of said peripheral ports is opened by the action of a rotary valve provided therein to supply rich mixture into the combustion chamber and during the last half period of the suction stroke the other peripheral port is opened by the action of a rotary valve therein to supply air into said combustion chamber.

7 Claims, 8 Drawing Figures

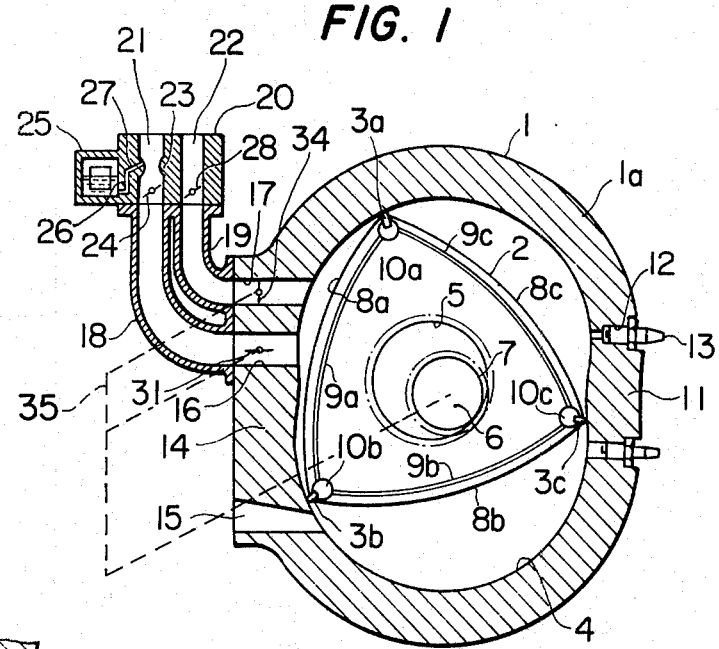
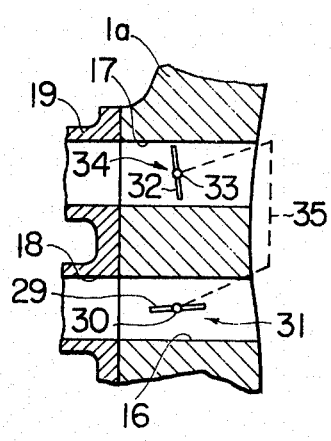
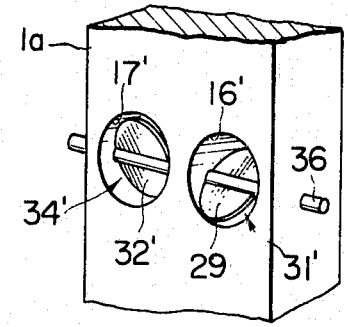
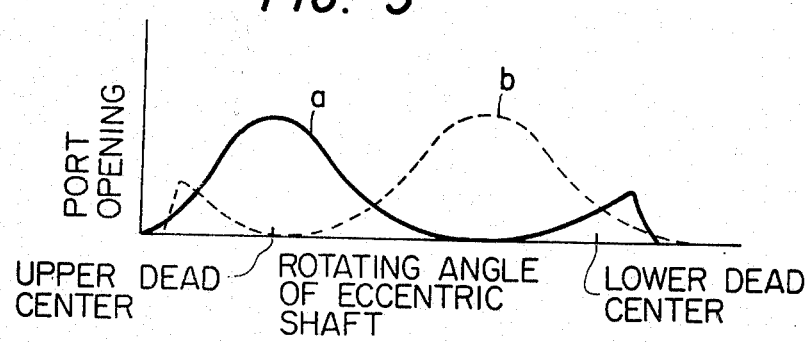

ROTARY PISTON ENGINE

BACKGROUND OF THE INVENTION

This invention relates generally to a rotary engine adapted for use in automobiles, and more particularly to the type of rotary engine featuring an improvement in the mixture suction mechanism which permits good stratification of the mixture in the combustion chamber.

In rotary engines known heretofore, the spark plugs are provided in sequestered recessed in the inner peripheral surface of the rotor housing, so that scavenging in the plugs becomes imperfect, resulting in a drawback in that a lean mixture is hard to ignite.

Also, in such rotary engines, although the flame produced by the spark plugs propagates at extremely high speed toward the leading side, or in the direction of rotation of the rotor, such flame propagation is sluggish on the trailing side, or in the direction opposite to the direction of rotor rotation, and this causes imperfect combustion on the trailing side, resulting in increased fuel consumption and increased discharge of unburned harmful components in the exhaust gas.

In order to overcome such defects of rotary engines, efforts have been extended for materializing a so-called stratified combustion system in which the mixture in the combustion chamber is stratified such that the mixture on the leading side is rich while that on the trailing side is lean. There have been proposed several methods for attaining such stratification of the mixture. In one such method, a rich mixture is first supplied, from a peripheral port upon passage of an apex seal through such port and then, with a slight delay, lean mixture or air is supplied from a side port with passage of a side seal therethrough. In another method, rich mixture is supplied together with lean mixture of air from the respective peripheral ports with passage of the respective apex seal therethrough.

However, according to the former method, since lean mixture or air is supplied from a direction substantially perpendicular to the high speed gas flow moving in the direction of rotation of the rotor in the combustion chamber, turbulence tends to occur in the flow of charge in the combustion chamber thereby making it difficult to accomplish definite stratification of the mixture.

In the latter method, no such problem of turbulence of the charge flow in the combustion chamber arises, but according to this latter method, it becomes essential that a peripheral port for feeding rich mixture and another peripheral port for feeding lean mixture or air are located at pertinent positions closely adjacent to each other. This requirement arises in consideration of the fact that the overlap of the charge and discharge is increased if the ports are positioned too close to the minor axis side while the effective compression ratio at low speed is reduced if the ports are positioned too distant from said minor axis side. However, it becomes hardly possible to aptly adjust the timing of port openings with passage of the apex seal and hence it is difficult to obtain a good pattern of stratification.

The present invention then aims at accomplishing good stratification of the mixture in the combustion chamber by overcoming the difficulties previously discussed. According to the present invention, both rich mixture and lean mixture or air are supplied from the respective peripheral ports at good timing relative to each other by means of rotary valves in the suction system with no regard to passage of the apex seals.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

SUMMARY OF THE INVENTION

Briefly, the present invention may be described as a rotary engine comprising a rotor housing defining interiorly thereof a rotor chamber bounded by a trochoidally-shaped inner peripheral wall of the housing with a rotor being mounted for rotation in a given direction within the rotor chamber so defined. The inner peripheral wall includes a pair of minor axis portions and a first and a second port both opening into the rotor chamber are located to extend through one of the minor axis portions of the inner wall. The first and second ports are located closely adjacent each other but spaced apart in the direction of rotor rotation and the first port is arranged to deliver a rich fuel mixture into the rotor chamber with the second port delivering either air or a lean fuel mixture. Each of the ports has arranged therein valve means and the invention includes means for operating the valve means in each of said ports interdependently of each other with each valve means opening and closing inversely of the other. Thus, when one of the valve means is fully closed the other of the valve means is fully opened. The valve means operate to supply rich fuel mixture and air or lean fuel mixture in a predetermined relationship into the rotor chamber.

DESCRIPTION OF THE DRAWINGS

In the drawings:

FIG. 1 is a sectional view of a rotary engine embodying the present invention;

FIG. 2 is an enlarged sectional view showing in detail a part of the engine shown in FIG. 1;

FIG. 3 is a diagram illustrating the timing of opening and closing of the peripheral ports according to the present invention for one of the combustion chambers of the engine;

FIG. 5 is a perspective view of a principal section of a rotary engine according to another embodiment of the present invention.

DESCRIPTION OF THE PREFERRED EMBODIMENTS

Figure 4A:
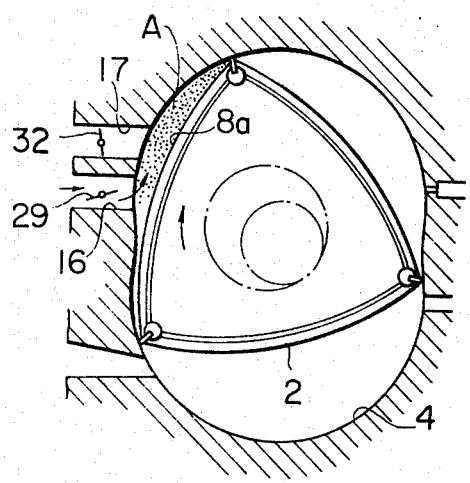
FIGS. 4 a to d are schematic drawings showing the behavior of the rotary engine of the present invention in its respective stages of operation.

Referring to FIG. 1, a generally triangular rotor 2 is provided within a rotor housing 1. At three apexes of the rotor 2 there are provided apex seals 3a–3c arranged in contact with a trochoidal inner peripheral surface 4 of a peripheral wall 1a.

The rotor 2 is eccentrically rotatable with an internal gear 5 being meshed with a fixed gear 7 on an eccentric shaft 6. Along the three arcuate side faces 8a–8c of the rotor 2 there are provided side seals 9a–9c which are joined to respective apex seals 3a–3c through corner seals 10a–10c.

Spark plugs 13 are provided in recesses 12 formed in one minor axis portion 11 of the rotor housing peripheral wall 1a, and an exhaust port 15 is formed in the trailing side of the other minor axis portion 14. At suitable positions on the leading side of the minor axis portion 14 there are provided a first peripheral port 16 for feeding rich mixture and another or second peripheral port 17 for feeding air, with both peripheral ports being arranged closely adjacent to each other along the direction of the rotor rotation.

These peripheral ports 16 and 17 are connected separately to a mixture supply passage 21 and an air supply passage 22 in a carburetor 20 through suction pipes 18 and 19, respectively. In the mixture supply passage 21 there are provided, as in a usual carburetor, a venturi 23, a throttle valve 24 and a nozzle 27 for injecting fuel from a float chamber 25 through a passage 26, whereby a rich mixture of air and fuel is formed and guided into the peripheral port 16. The air supply passage 22, provided with another throttle valve 28 operatively connected to the throttle valve 24, is designed to guide air from an air cleaner (not shown) into the peripheral port 17.

On the inside of the peripheral port 16, as shown in detail in FIG. 2, there is provided first valve means in the form a rotary valve 31 consisting of a disc-shaped valve body 29 and a valve stem 30 mounted transversely to the valve body, with valve stem 30 being pivotally supported in the peripheral wall 1a of the rotor housing so that the rotary valve 31 is rotatable.

In the peripheral port 17 there is also provided second valve means in the form of a similar rotary valve 34 consisting of a disc-shaped valve body 32 and a valve stem 33. These two rotary valves 31 and 34 are arranged such that the valve bodies 29 and 32 are set with a stagger of about 90° relative to each other in the direction of rotation, with the valve stems 30 and 33 being connected to the eccentric shaft 6 by a connecting means 35 so that they rotate at, for example, a 1 : 2 velocity ratio.

Thus, the peripheral ports 16 and 17 may be fully opened, fully closed or opened at an intermediate degree, accordingly, as the rotary valves 31 and 34 take a horizontal, vertical or intermediate slanting situation with rotation of the valve bodies 29 and 32, respectively.

The timing of such opening and closing of the peripheral ports 16 and 17 for one combustion chamber of the engine is graphically illustrated in FIG. 3. It will be noted that the peripheral port 16, as represented by a curve a, is fully opened at the upper dead center point and fully closed as the angle of rotation of the eccentric shaft reaches 180°, while the peripheral port 17, as represented by a curve b, is fully closed at the upper dead center point and fully opened as the angle of rotation of the eccentric shaft reaches 180°.

Figure 4B:
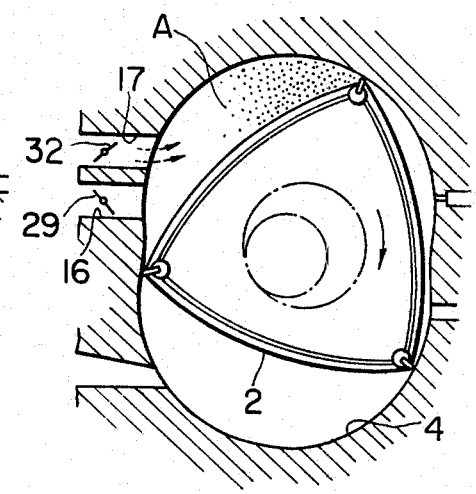
Figure 4C:
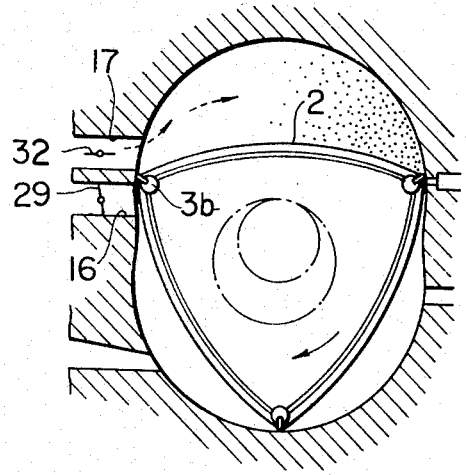

It should be noted that the terms "upper dead center" and "lower dead center" are herein intended in accordance with their conventional definition, with the upper dead center position being reached just prior to the position depicted in FIG. 4a when the volume of chamber A is at a minimum value, and with the lower dead center position being depicted in FIG. 4c.

In order to describe the operation of the rotary engine according to the invention, reference will be made to FIGS. 4 a – d. At the start of the suction stroke, the peripheral port 16 is fully opened by the rotary valve 31 while peripheral port 17 is fully closed by the rotary valve 34 as shown in FIG. 4a. Thus, a large quantity of rich mixture alone is supplied from the mixture supply passage 21 of the carburetor 20 into the leading side section of the combustion chamber A defined between the inner peripheral surface 4 of the rotor housing and the arcuate surface 8a of the rotor 2.

As the rotor rotation advances and the valve bodies 29, 32 of the rotary valves 31, 34 turn correspondingly as shown in FIG. 4b, the peripheral port 16 begins to close to gradually reduce the supply of rich mixture while the other peripheral port 17 begins to open to supply air from the air supply passage 22. When the apex seal 3b on the trailing side of the combustion chamber A passes the peripheral port 16 as shown in FIG. 4c, the peripheral port 16 is now fully closed by the rotary valve 31 to cease supply of rich mixture while the peripheral port 17 is fully opened by the rotary valve 34 to feed a great amount of air into the trailing side section of the combustion chamber A.

Figure 4D:
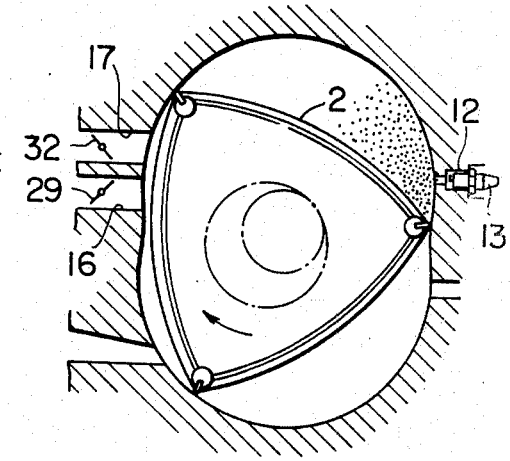

During this period, blow-back of the exhaust in another combustion chamber (which is in the discharge stroke) toward the carburetor 20 is prevented by the closing behavior of the peripheral port 16 by the rotary valve 31. In this way, rich mixture and air are charged in a stratified form in both leading and trailing side sections of the combustion chamber A and the mixture is carried toward the spark plug 13 with rotation of the rotor 2 and it is compressed while scavenging the recess 12 with rich mixture as shown in FIG. 4d. When the mixture is ignited by the spark plug 13 at the end of the compression stroke, only rich mixture in the leading side section of the combustion chamber A is burned with propagation of the flame toward the leading side.

FIG. 5 shows another embodiment of the present invention. In this embodiment, a peripheral port 16' for supplying rich mixture and a peripheral port 17' for supplying air are provided side-by-side in the peripheral wall 1a of the rotor housing as shown, and in these peripheral ports 16', 17' there are provided rotary valves 31', 34' of which valve bodies 29', 32' are mounted on a common valve stem 36 so that the valves operate similarly to those of the preceding embodiment. The rotary valves 31', 34' of the embodiment of FIG. 5 are considered somewhat more advantageous structurally.

In still another embodiment, valve means may be provided in the suction pipes 18, 19. This facilitates assemblage of the parts. It is also possible to supply lean mixture into the suction pipe 19 to accomplish desired stratification of rich mixture and lean mixture.

According to the present invention, as described above, both rich mixture and air are supplied from the respective peripheral ports 16 and 17 in the peripheral wall 1a of the rotor housing into the combustion chamber A without causing any disorder or turbulence. Furthermore, such rich mixture and air are supplied at good timing by means of the rotary valves 31, 43 regardless of passage of the apex seals 3a–3c of the rotor 2, so that good stratification is attained. Also, since the two peripheral ports 16, 17 are provided closely adjacent to each other at suitable positions in the direction of rotor rotation, it is possible to avoid the difficulty that would result from too distant a spacing of the two peripheral ports, one on the leading side and the other on the trailing side of the rotor.

While specific embodiments of the invention have been shown and described in detail to illustrate the application of the inventive principles, it will be understood that the invention may be embodied otherwise without departing from such principles.

What is claimed is:

1. A rotary engine comprising a rotor housing defining interiorly thereof a rotor chamber bounded by a trochoidally-shaped inner peripheral wall of said housing, a rotor mounted for rotation in a given direction within said rotor chamber, said inner peripheral wall including a pair of minor axis portions and defining together with said rotor a plurality of combustion chambers therebetween, a first port and a second port both opening into said rotor chamber through one of said minor axis portions closely adjacent each other but spaced apart in the direction of rotor rotation, said second port being located forwardly of said first port relative to said given direction of rotor rotation, means for delivering a first flowing fluid consisting of a rich fuel mixture into said rotor chamber through said first port, means for delivering into said rotor chamber through said second port a second flowing fluid which is leaner than said first fluid, first valve means arranged to open and close fluid flow through said first port, second valve means arranged to open and close fluid flow through said second port, and means for controlling operation of said first and said second valve means to effect delivery into said combustion chambers of said first and second fluids in relationship to the rotation of said rotor to introduce said first fluid into a leading end portion of each of said combustion chambers taken relative to the direction of rotation of said rotor and to introduce said second fluid into a trailing end portion of each of said combustion chambers.

2. A rotor engine according to claim 1 including means controlling the opening and closing of said first and second valve means interdependently of each other.

3. A rotor engine according to claim 1 wherein said first and second valve means are mechanically interconnected to open and close interdependently of each other.

4. A rotary engine according to claim 1 wherein said first and said second valve means are operatively interconnected to open and close interdependently of each other, with each of said valve means being operated to open and close inversely of the operating direction of the other of said valve means.

5. A rotary engine according to claim 1 including means operatively interconnecting said first and said second valve means to open and close interdependently of each other, said interconnecting means operating to render one of said valve means fully closed when the other of said valve means is fully opened, said valve means being operated each inversely to the other to control its degree of opening to supply said fluid flowing through said first and said second ports in a predetermined relationship.

6. A rotary engine according to claim 1 wherein said second flowing fluid consists of a lean fuel-air mixture.

7. A method for operating a rotary engine including a rotor housing defining interiorly thereof a rotor chamber bounded by a trochoidally-shaped peripheral wall of said housing, a rotor mounted for rotation in a given direction within said rotor chamber, a plurality of combustion chambers defined between said rotor and said inner peripheral wall, a first port and a second port both opening into said rotor chamber through a minor axis portion of said inner peripheral wall and spaced apart in the direction of rotor rotation closely adjacent each other with said second port located forwardly of said first port relative to the direction of rotor rotation, and first and second valve means arranged to control fluid flow through said first and second ports, respectively, said method comprising the steps of delivering to said rotor chamber through said first port a first flowing fluid consisting essentially of a rich air-fuel mixture, delivering to said rotor chamber through said second port a second flowing fluid which is leaner than said first flowing fluid and operating said first and second valve means in relationship to the rotation of said rotor to introduce into each of said combustion chambers a rich air-fuel mixture consisting of said first flowing fluid into the leading end of each of said combustion chambers taken relative to the direction of rotation and a leaner fluid consisting essentially of said second flowing fluid into the trailing end of each of said combustion chambers.

* * * * *